(No Model.)
H. ROTH.
CAR AXLE BOX.
No. 255,675. Patented Mar. 28, 1882.
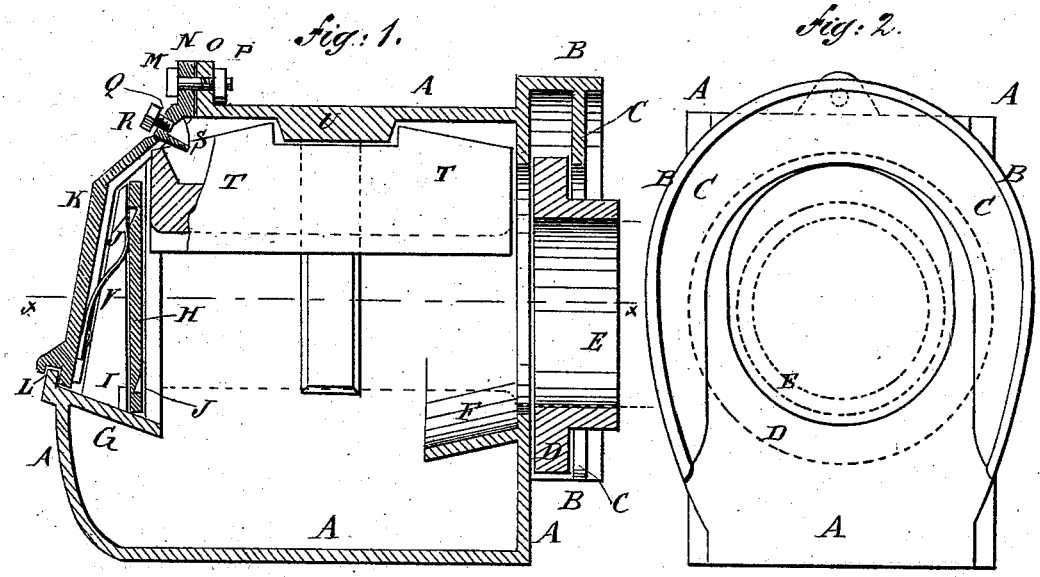
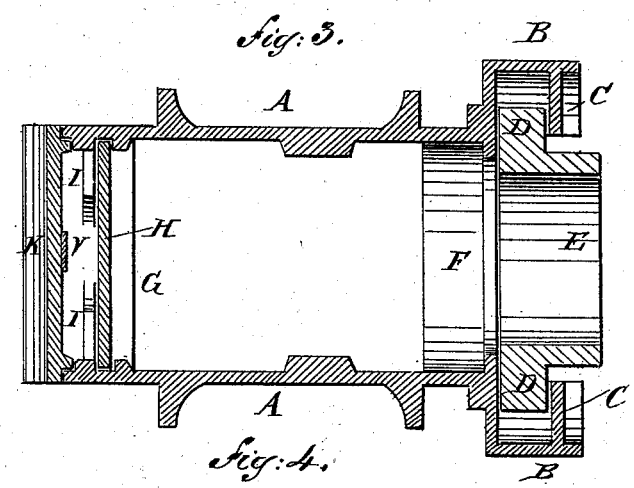
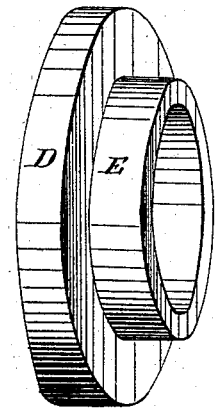
WITNESSES:
Chas. Nidig.
C. Sedgwick
INVENTOR:
H. Roth
BY Munn & Co
ATTORNEYS.

UNITED STATES PATENT OFFICE.

HENRY ROTH, OF NEW YORK, N. Y., ASSIGNOR OF ONE-HALF TO LENA R. ROSS, OF NEW ORLEANS, LOUISIANA.

CAR-AXLE BOX.

SPECIFICATION forming part of Letters Patent No. 255,675, dated March 28, 1882.

Application filed October 22, 1881. (No model.)

*To all whom it may concern:*

Be it known that I, HENRY ROTH, of the city, county, and State of New York, have invented a new and useful Improvement in Journal-Boxes, of which the following is a full, clear, and exact description.

Reference is to be had to the accompanying drawings, forming a part of this specification, in which similar letters of reference indicate corresponding parts in all the figures.

Figure 1 is a sectional side elevation of my improvement. Fig. 2 is an end elevation of the same. Fig. 3 is a sectional plan view of the same, taken through the line $x\, x$, Fig. 1. Fig. 4 is a perspective view of the washer and guard-tube.

The object of this invention is to improve the construction of journal-boxes in such a manner as to prevent the lubricant from escaping from the said journal-boxes, prevent dust from entering them, and facilitate the insertion of the lubricant.

A represents the shell of a journal box, in the rear end of which is formed an oblong opening to receive the journal of the car-axle.

Around the sides and upper part of the opening in the rear end of the shell A is formed a flange, B. Upon the inner surface of the flange B is formed an inwardly-projecting flange, C, which is placed at such a distance from the rear end of the shell A as to form a sufficient space to receive the washer D. The washer D is made of such a size as to cover the oblong opening in the rear end of the shell A, and with an aperture sufficiently large to receive and fit upon the journal of the car-axle. Upon the outer side of the inner edge of the washer D is formed a tube, E, to receive and fit upon the car-axle. With this construction the flanges B C prevent dust from passing in around the outer edge of the washer D, and the tube E prevents dust from passing in around the inner edge of the said washer. The washer D and tube E are made of rubber molded in one piece, so that the said washer and tube can be placed upon axles that may vary in size, and thus facilitate the fitting of the said washers and tubes to the said axles.

Upon the inner surface of the lower part of the inner end of the shell A is formed an inwardly-projecting flange, F, to prevent the oil or other lubricant from splashing out around the lower side of the journal.

Upon the inner surface of the front of the shell A, at the bottom of the front opening in the said shell, is formed an inwardly-projecting flange, G, to prevent the oil or other lubricant from splashing upward and outward at the front of the said shell A. The outward thrust of the car-axle is received upon the check-plate H, the side edges of which rest in grooves in the inner surface of the forward part of the sides of the shell A. The outer side of the lower edge of the check-plate H rests against a flange, I, formed upon the upper side of the splash-flange G. The middle part of the flange I is cut away, as shown in Fig. 3, to allow any oil that may pass out around the edges of the check-plate H to flow back into the lower part of the journal-box.

In the upper middle part of the outer side and in the lower middle part of the inner side of the check-plate H are formed beveled recesses J to receive the end of a chisel, screw-driver, or other tool, for convenience in raising the said check-plate from its seat. This construction allows the check-plate H to be reversed when one side becomes worn by the end of the journal of the axle. The front opening of the shell A is closed by a cap, K, the edge of which is grooved to receive the flange L, formed along the outer edge of the splash-flange G. The side edges of the cap K are rabbeted to fit upon the rabbeted edges of the shell A, as shown in Fig. 3, to prevent any oil from escaping around the edges of the said cap K. The cap K is secured in place by a bolt, M, which passes through a hole in a lug, N, formed upon the upper edge of the said cap K, and through a hole in a corresponding lug, O, formed upon the top of the outer end of the shell A. The forward end of the bolt M is screwed into a square nut, P, the lower edge of which rests upon the top of the shell A, so that the said nut cannot turn and work loose.

In the upper part of the cap K is formed a hole, Q, through which oil can be poured into the journal-box without removing the said cap K. The oil-hole Q is closed by a screw-plug, R, screwed into the said oil-hole.

Upon the inner side of the cap K, just below the oil-hole Q, is formed a small spout, S, to guide the oil into the cavity in the upper side of the brass T, upon which the journal-box rests. In the middle part of the upper side of the brass T is formed a recess to receive a projection, U, formed upon the inner surface of the top of the shell A, so that the weight of the car rests squarely upon the brasses.

To the lower part of the inner surface of the cap K is attached the lower end of a spring, V, the upper end of which rests against the outer surface of the upper part of the check-plate H to prevent the said check-plate from rattling.

Having thus described my invention, I claim as new and desire to secure by Letters Patent—

1. In a journal-box, the check-plate H, made with beveled recesses J in the upper part of its outer side and the lower part of its inner side, substantially as herein shown and described, whereby the said check-plate can be reversed when worn, as set forth.

2. In a journal-box, the combination, with the check-plate H and the cap K, of the spring V, substantially as herein shown and described, whereby the said check-plate is held from rattling, as set forth.

3. In a journal-box, the combination, with the cap K, having oil-hole Q, of the spout S, substantially as herein shown and described, whereby the oil is conducted into the interior of the brass, as set forth.

4. In a journal-box, the washer D and guard-tube E, made of rubber and in one piece, substantially as herein shown and described, whereby the said washer can be placed upon axles varying in size, as set forth.

HENRY ROTH.

Witnesses:
JAMES T. GRAHAM,
C. SEDGWICK.